United States Patent
Rohrmüller et al.

(10) Patent No.: US 10,773,658 B2
(45) Date of Patent: Sep. 15, 2020

(54) FOLDING-IN DEVICE FOR A MIRROR REPLACEMENT SYSTEM

(71) Applicant: MAN Truck & Bus AG, Munich (DE)

(72) Inventors: Hans Rohrmüller, Maisach (DE); Erich Schönegger-Fösleitner, St. Gallen (AT); Marc Schippling, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 56 days.

(21) Appl. No.: 15/920,024

(22) Filed: Mar. 13, 2018

(65) Prior Publication Data
US 2018/0265015 A1   Sep. 20, 2018

(30) Foreign Application Priority Data

Mar. 16, 2017  (DE) .................. 10 2017 002 578

(51) Int. Cl.
*B60R 11/04* (2006.01)
*B60R 1/06* (2006.01)
*H04N 5/225* (2006.01)

(52) U.S. Cl.
CPC ............ *B60R 11/04* (2013.01); *B60R 1/0617* (2013.01); *H04N 5/2252* (2013.01)

(58) Field of Classification Search
CPC ....... B60R 11/04; B60R 1/0617; B60R 1/074; B60R 1/076; H04N 5/2252
See application file for complete search history.

(56) References Cited

U.S. PATENT DOCUMENTS

| 5,005,797 | A | * | 4/1991 | Maekawa | ............... B60R 1/076 248/289.11 |
| 5,027,200 | A | | 6/1991 | Petrossian et al. | |
| 5,028,029 | A | * | 7/1991 | Beck | .................... B60R 1/0617 248/289.11 |
| 6,916,100 | B2 | * | 7/2005 | Pavao | .................. B60Q 1/2665 359/841 |
| 2006/0285235 | A1 | * | 12/2006 | Brouwer | ................. B60R 1/074 359/877 |
| 2010/0238570 | A1 | * | 9/2010 | Reedman | ................ B60R 1/074 359/841 |

(Continued)

FOREIGN PATENT DOCUMENTS

DE   2432707 A1   1/1976
DE   3136840 A1   3/1983
(Continued)

*Primary Examiner* — Neil R Mikeska
(74) *Attorney, Agent, or Firm* — Weber Rosselli & Cannon LLP

(57) ABSTRACT

The present disclosure relates to a device for folding in a camera on a motor vehicle in order to protect the device in the event of a collision with an obstacle. The device has a first housing element, in which the camera is received. The device has a second housing element, which is constructed to be connected to the motor vehicle in a positionally fixed manner. The first housing element and the second housing element are pivotably connected to each other by means of a first pivot connection, which defines a first rotation axis, and a second pivot connection, which defines a second rotation axis which is spaced apart from the first rotation axis.

13 Claims, 6 Drawing Sheets

(56) References Cited

U.S. PATENT DOCUMENTS

| | | | |
|---|---|---|---|
| 2011/0075285 A1* | 3/2011 | Mueller | B60R 1/0617 359/872 |
| 2014/0376119 A1* | 12/2014 | Sobecki | B60R 1/074 359/841 |
| 2015/0097955 A1* | 4/2015 | De Wind | B60R 1/062 348/148 |
| 2016/0114730 A1* | 4/2016 | Lee | B60R 1/04 359/865 |
| 2016/0243988 A1* | 8/2016 | Peterson | B60R 1/072 |

FOREIGN PATENT DOCUMENTS

| | | |
|---|---|---|
| DE | 3440477 A1 | 5/1986 |
| DE | 3923922 A1 | 1/1991 |
| DE | 19758293 A1 | 7/1999 |
| DE | 102012015385 B3 | 8/2013 |
| DE | 102012015395 B3 | 11/2013 |
| JP | S611551 A | 1/1986 |

\* cited by examiner

FOLDING-IN DEVICE FOR A MIRROR REPLACEMENT SYSTEM

BACKGROUND

The present disclosure relates to a device for folding in a camera on a motor vehicle, in particular a folding-in device for a mirror replacement system of a motor vehicle. The present disclosure further relates to a motor vehicle having a device for folding in a camera.

The rear view mirror systems which are used to cover indirect fields of vision are being increasingly replaced by camera/display systems. The cameras required have to be arranged with a specific lateral spacing and/or in front of the vehicle in order to be able to cover the required viewing zones. There are thereby produced camera arms which can reach a considerable dimension.

As a result of the required exposed position, the fields of vision from the point of view of the driver which are often not present and the risk of damage which is present as a result of contact with other objects, the camera arms are intended to advantageously be provided with a folding-in mechanism. The folding-in mechanism enables the camera arm DE to be folded in when striking an obstacle.

DE 10 2012 015 385 B3 discloses, for example, a folding-in mechanism. A camera arm for a mirror replacement system of a motor vehicle contains a first housing element and a second housing element. The first housing element receives an image recording unit. The second housing element is adapted to be connected in a positionally fixed manner to the bodywork of the motor vehicle. A pivot mechanism is provided between the first housing element and the second housing element so that the first housing element can be pivoted relative to the second housing element about a pivot axis.

U.S. Pat. No. 5,027,200 A discloses a camera unit which can be fitted laterally to a utility vehicle. The camera unit can be retracted by means of a retraction and deployment mechanism in a translational manner into a recess in the housing or deployed therefrom. Furthermore, the camera arrangement may have two pivot mechanisms for pivoting the camera during operation. The camera can thus be pivoted during operation about a horizontal axis and about a vertical axis. However, the device is not suitable for folding in. The device cannot change the extension arm length, that is to say, the spacing with respect to the vehicle, so that the housing components cannot be folded relative to each other.

Folding-in devices require geometric limitations on the components which can be pivoted relative to each other, that is to say, the camera arm and the camera base. This results in component geometries which have to take into account specific pivoting freedoms, thereby have aerodynamically unfavourable influences and with regard to the design are subjected to limiting constraints.

SUMMARY

The present disclosure is directed to an improved folding-in device. In particular, a folding-in device which provides the pivoting freedom in such a manner that the entire system is enabled to configure to the greatest possible extent freely selectable and closed geometries of a camera arm and a camera base as far as the vehicle bodywork outer contour.

The device for folding in a camera on a motor vehicle for protecting the device in the event of a collision with an obstacle is in particular a folding-in device for a mirror replacement system of a motor vehicle. The device has a first housing element, in particular a camera arm, in which the camera is received or can be received. The device has a second housing element, in particular a camera base, which is constructed to be connected in a positionally fixed manner to the motor vehicle (a bodywork of the motor vehicle). The first housing element and the second housing element are pivotably connected to each other by means of a first pivot connection which defines a first rotation axis. In addition, the first housing element and the second housing element are pivotably connected to each other by means of a second pivot connection which defines a second rotation axis. The first and the second rotation axis are spaced apart from each other.

The provision of a plurality of rotation axes enables a wide pivot range of the first housing element so that it can be folded far away with respect to a striking member. This advantage can be even further increased by the two rotation axes being arranged as close as possible to the bodywork of the vehicle. The first housing element and the second housing element can additionally as a result of the provision of two pivot connections be constructed in a more flexible manner. This may in particular be advantageous when constructing an aerodynamic outer shell of the device.

In this instance, the term "device for folding in" or "folding-in device" is intended to refer to a device which changes the extension arm length of the device, that is to say, a spacing with respect to the vehicle bodywork, between an operating position and a folded-in position. Consequently, the device may be moved into a folded-in position in the event of a collision with an obstacle or in a preventive manner prior to a collision with an obstacle in order to avoid the obstacle by reducing the extension arm length. In particular, the terms do not relate to devices which are provided to pivot the camera during operation in order to change the field of vision of the camera.

The first pivot connection and/or the second pivot connection may, for example, be constructed as rotatably supported pivot pins or rotary rods.

In the first housing element, a plurality of cameras may also be received for monitoring a plurality of regions.

Advantageously, the first rotation axis may be substantially parallel with the second rotation axis.

In this instance, the term "substantially" with respect to the parallel arrangement of the first rotation axis and the second rotation axis is intended to mean that the first rotation axis and the second rotation axis enclose an angle less than 10°, in particular less than 5°, preferably less than 2.5° or extend parallel with each other. With a crooked arrangement, the term is intended to mean that a first plane perpendicular to the first rotation axis and a second plane perpendicular to the second rotation axis enclose an angle less than 10°, in particular less than 5°, preferably less than 2.5° or extend parallel with each other.

In an embodiment, the first housing element can be pivoted relative to the second housing element out of an operating position for the camera in a first direction to a first folded-in position and/or in a second direction to a second folded-in position. The second direction is in particular counter to the first direction. This enables the device to be able to be selectively pivoted forwards or backwards.

In a construction variant, the first housing element and the second housing element are connected to each other in such a manner that the first housing element is acted on from an intermediate position between the operating position and the first folded-in position in order to assume the operating position or the first folded-in position. Alternatively or additionally, the first housing element and the second housing element are connected to each other in such a manner that the first housing element is acted on from an intermediate position between the operating position and the second folded-in position in order to assume the operating position or the second folded-in position.

In other words, for example, a force may act on the housing elements in such a manner that only the operating position and the folded-in positions are stable positions for the first housing element. From an intermediate position between the folded-in positions and the operating position, the first housing element will move independently, for example, under the influence of a force, to one of the stable positions.

In a further embodiment, the first housing element and the second housing element are connected to each other by means of at least one top dead centre bearing. The top dead centre bearing may be provided in such a manner that (only) the operating position for the camera and the folded-in positions are stable positions for the first housing element.

The top dead centre bearing and the action of the first housing element in the intermediate position for assuming a stable position prevents the first housing element from folding in with only a small action of force, for example, in the event of headwind during travel of the motor vehicle.

The device may further have an intermediate member. The first housing element and the intermediate member are pivotably connected to each other by means of the first pivot connection. Alternatively or additionally, the second housing element and the intermediate member are pivotably connected to each other by means of the second pivot connection.

The intermediate member may be constructed and connected to the first housing element and the second element in such a manner that the intermediate member also pivots when the first housing element is pivoted from the operating position for the camera to the first folded-in position and/or does not also pivot when the first housing element is pivoted from the operating position for the camera to the second folded-in position.

In another construction variant, the first housing element has a first connection region. The first connection region is connected via the first pivot connection to the intermediate member. The intermediate member has a first guiding element, in particular a first guiding sleeve. The guiding element is supported on a first guiding contour of the first connection region.

Alternatively or additionally, the second housing element has a second connection region which is connected via the second pivot connection to the intermediate member. The intermediate member has a second guiding element, in particular a second guiding sleeve, which is supported on a second guiding contour of the second connection region.

As a result of the guiding elements which are supported on a guiding contour, the first housing region can be pivoted so as to be guided between the operating position and the folded-in position.

In another embodiment, the first guiding element and/or the second guiding element is/are supported so as to be able to be displaced, in particular displaced in a translational manner. The displaceable support enables the respective guiding element to be supported on the respective guiding contour of the connection region and to follow it during the pivoting.

The first guiding element and/or the second guiding element may, for example, be displaceably supported in a chamber in the intermediate member. In addition, the first guiding element and the second guiding element may protrude at opposing ends from the chamber in order to contact the guiding contour.

The intermediate member may be constructed from a first region and a second region. The first region may be securely connected to the second region. The first region may be connected via the first pivot connection to the first housing element, in particular the first connection region. The first region may be connected via the second pivot connection to the second housing element, in particular the second connection region. The second region may have the first guiding element, the second guiding element and/or the chamber.

In another embodiment, the intermediate member has a resilient component, in particular a pressure spring. The resilient component acts on the first guiding element for support on the first guiding contour. Alternatively or additionally, the resilient component acts on the second guiding element for support on the second guiding contour. Alternatively or additionally, the resilient component supports the first guiding element and the second guiding element with respect to each other.

The resilient component may, for example, be arranged in the chamber of the intermediate member between the first guiding element and the second guiding element.

Advantageously, the first guiding contour and the first guiding element are constructed in such a manner that the first housing element and the intermediate member can be pivoted relative to each other between two pivot positions via a top dead centre bearing. Alternatively or additionally the second guiding contour and the second guiding element are constructed in such a manner that the second housing element and the intermediate member can be pivoted relative to each other between two pivot positions via a top dead centre bearing. If the stable pivot positions of the top dead centre bearing are, for example, constructed as the folded-in position(s) and the operating position for the camera, this position can be assumed in a particularly simple manner. The first housing element may thus, for example, in the event of contact, fold directly into a folded-in position in order to prevent greater damage. From a folded-in position, the first housing element may additionally be returned in a simple manner via the top dead centre bearing into the operating position. The top dead centre bearing additionally prevents the first housing element from folding in with only a small application of force, for example, in the event of headwind during travel of the motor vehicle.

In another construction variant, the first guiding element is supported in a sliding manner or via a roller on the first guiding contour. Alternatively or additionally, the second guiding element is supported in a sliding manner or via a roller on the second guiding contour. Depending on the application, there are consequently available reliable mechanisms for supporting the guiding element.

In a further embodiment, an outer shell of the first housing element and an outer shell of the second housing element are in abutment with each other in a flush manner in an operating position of the first housing element for the camera.

That is to say, an outer edge of a first outer shell of the first housing element and an outer edge of a second outer shell of the second housing element can be in abutment with each other along a straight or curved line when the first housing element is relative to the second housing element in an operating position for the camera.

This has the advantage that in the operating position a closed geometry is formed by the first housing element and the second housing element. This may in beneficial for aerodynamic and aesthetic movement reasons.

In another embodiment, the device further has a drive unit, for example, an electric motor, for automatically pivoting the first housing element relative to the second housing element.

The drive unit can be used by a driver of the motor vehicle to fold in and fold back the first housing element if, for example, during manoeuvring he would like to reduce the extension arm length of the device in order, for example, to avoid an obstacle.

The drive unit may be arranged in the first housing element and/or the second housing element. Alternatively or additionally, the drive unit may be connected to the first pivot connection and/or to the second pivot connection.

The device further may have at least one bumper element. The bumper element is releasably fitted to the first and/or second housing element in order to protect the device in the event of a collision, in particular in order to protect the camera and the first housing element. The bumper element can be resiliently and/or plastically deformed. The bumper element may have an elastomer region. In the event of a collision, the bumper element may also become released, wherein nonetheless a folding-in of the first housing element is initiated. Consequently, damage to the first housing element and in particular the camera can be prevented. A new or repaired bumper element may then, as a result of the releasable fitting, be fitted to the first housing element again in a simple manner. The bumper element may also be designed as a wear component.

The present disclosure further relates to a motor vehicle, in particular a utility vehicle, which has the device as disclosed herein. The device may, for example, be fitted in a positionally fixed manner to an outer longitudinal side of a vehicle bodywork. In particular, the device may be fitted in a positionally fixed manner to an outer longitudinal side of a driver's cab of the vehicle bodywork.

The embodiments described above and features of the present disclosure can be freely combined with each other.

BRIEF DESCRIPTION OF THE DRAWINGS

Details and advantages of the present disclosure are described below with reference to the appended drawings, in which.

DETAILED DESCRIPTION

Figure 1A:
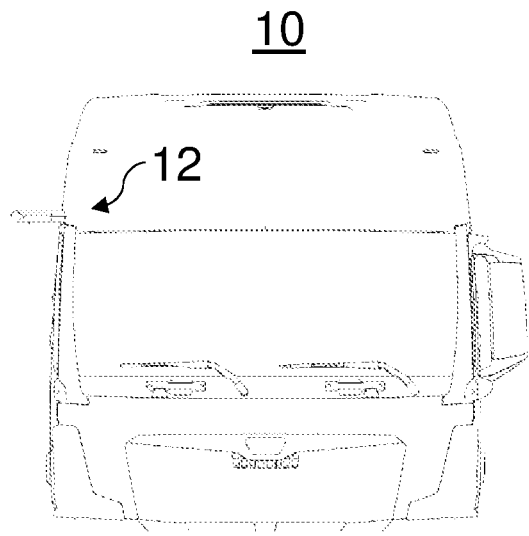
FIG. 1A is a front view of a region of a utility vehicle.
Figure 1B:
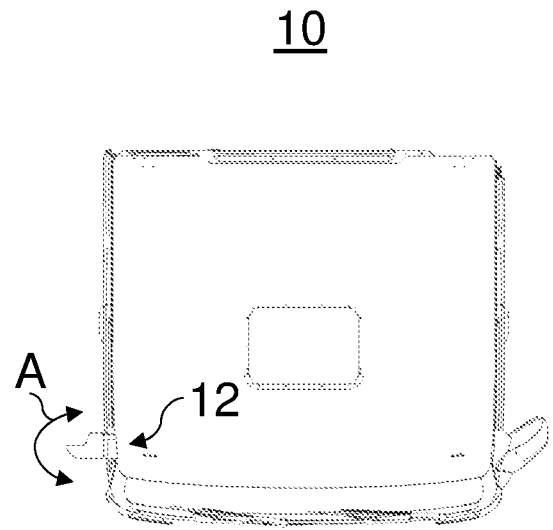
FIG. 1B is a plan view of a roof of a utility vehicle.

FIGS. 1A and 1B show a front region of a vehicle 10. At the driver side (left-hand side in the travel direction in this instance), the vehicle 10 is provided with a mirror system. At the passenger side, the vehicle 10 is provided with a system provided in a folding-in device 12. The folding-in device 12 is fitted in a positionally fixed manner to the bodywork of the vehicle 10, in particular to the driver's cab of the vehicle 10.

In FIG. 1B, the folding-in device 12 is positioned in an operating position for the camera which is received in the folding-in device 12. From this position, the folding-in device 12 can be pivoted in accordance with the double-headed arrow A forwards and backwards with respect to the travel direction of the vehicle 10. The folding-in operation can be carried out independently, for example, in the event of a collision with components of other road users or with static obstacles in the environment of the vehicle, such as, for example, gateways, wall projections, traffic signs, etcetera. The folding-in operation may additionally be carried out by the vehicle passengers in order, for example, to evade upcoming obstacles.

Figure 2A:
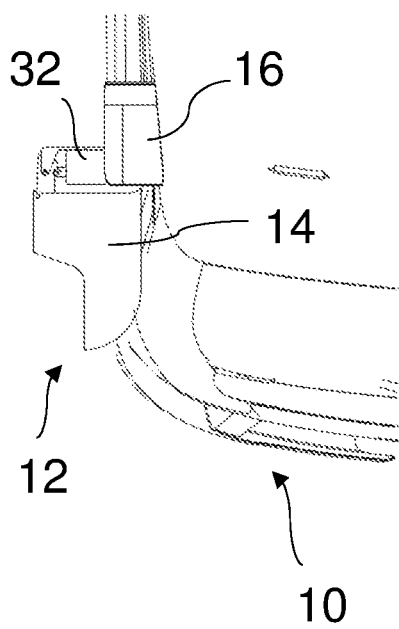
FIG. 2A is a plan view of a folding-in device in a first folded-in position.
Figure 2B:
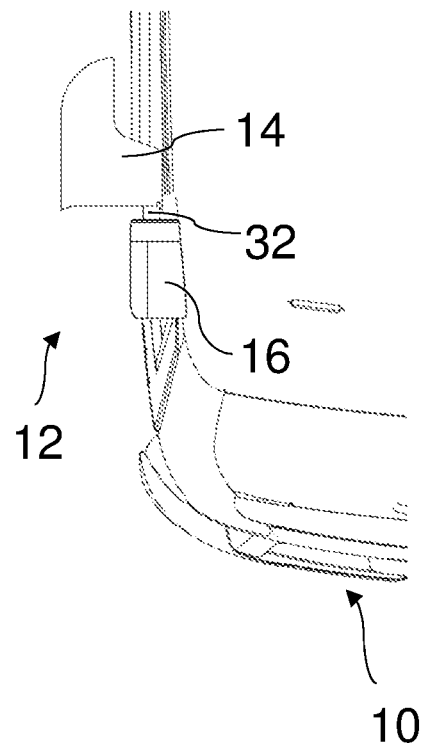
FIG. 2B is a plan view of the folding-in device in a second folded-in position.

FIGS. 2A and 2B show the folding-in device 12 in a front, first folded-in position (FIG. 2A) and a rear, second folded-in position (FIG. 2B). In the embodiment shown, the folding-in device 12 has a camera arm in the form of a first housing element 14. The folding-in device 12 additionally has a camera base in the form of a second housing element 16. The first housing element 14 is pivotably connected by means of an intermediate member 32 to the second housing element 16. The second housing element 16 is secured in a positionally fixed manner to the bodywork of the vehicle 10. The intermediate member 32 is partially received inside the second housing element 16.

Figure 3A:
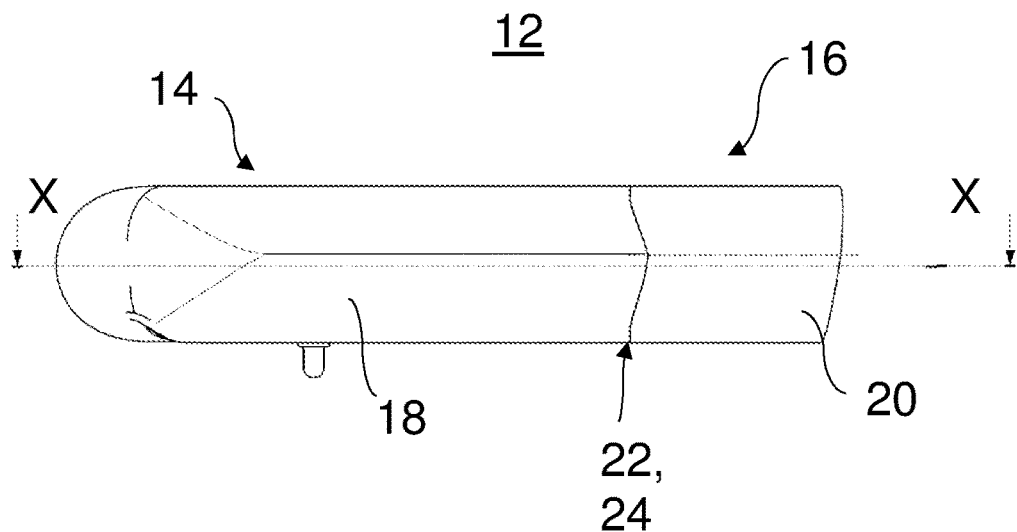
FIG. 3A is a front view of the folding-in device in an operating position for a camera which is received in the folding-in device.

In FIG. 3A, the folding-in device 12 is illustrated from the front in a travel direction of the vehicle. The folding-in device 12 (the first housing element 14) is located in the operating position for the camera. The first housing element 14 has an outer shell 18. The second housing element 16 has an outer shell 20. In the operating position, the outer shell 18 of the first housing element 14 and the outer shell 20 of the second housing element 16 are in abutment with each other in a flush manner. In detail, an outer edge 24 of the outer shell 18 of the first housing element 14 and an outer edge 22 of the outer shell 20 of the second housing element 16 touch each other. The contact between the outer edge 22 and the outer edge 24 takes place along a bent line. This arrangement and construction of the outer shells 18, 20 leads to a closed geometry of the folding-in device 12 in the operating position. This is particularly advantageous in terms of aerodynamic and design-related aspects.

Figure 3B:
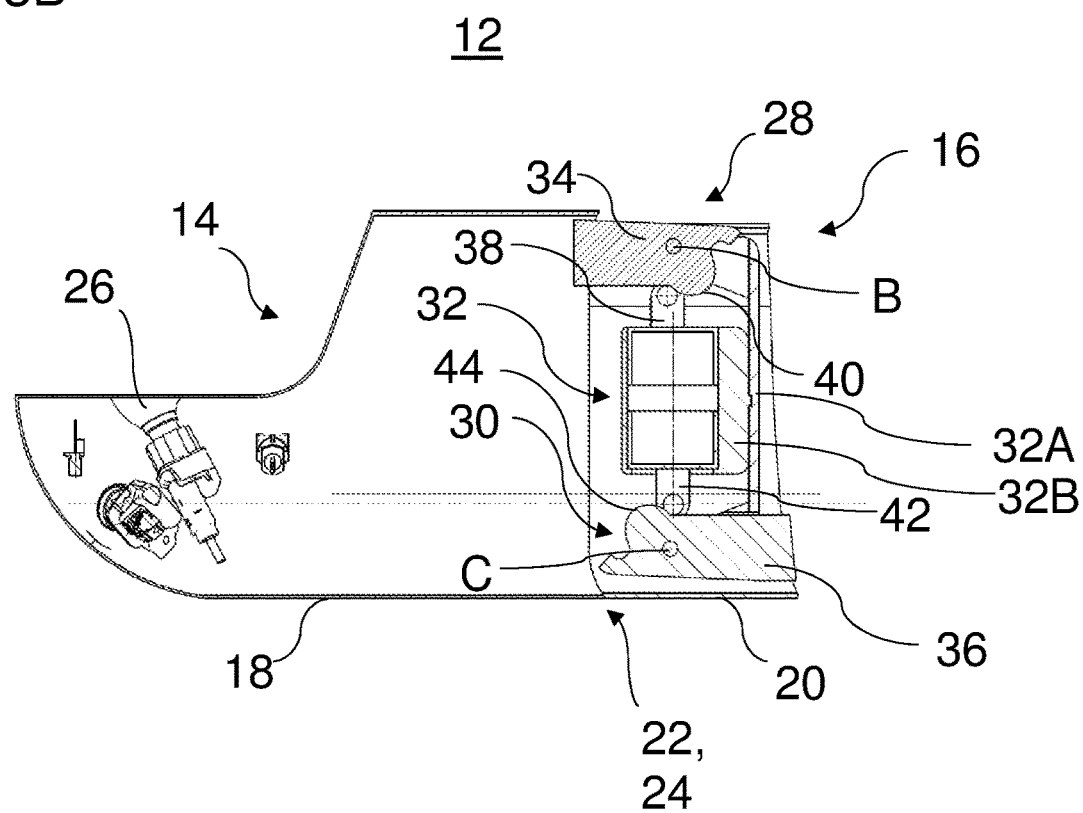
FIG. 3B is a sectioned view through the folding-in device along the line X-X in FIG. 3A.

FIG. 3B is a sectioned view of the folding-in device 12 along the line X-X in FIG. 3A. The folding-in device 12 has the first housing element 14, the intermediate member 32 and the second housing element 20. The camera 26 is arranged in the first housing element 14 and directed towards the desired region(s). In some embodiments, a plurality of cameras may also be arranged in the first housing element 14.

As illustrated in FIGS. 3A and 3B, the intermediate member 32 is positioned completely inside the outer shell 20 of the second housing element 16 when the second housing element 14 is in the operating position for the camera 26.

The first housing element 14 has a first connection region 34. The second housing element 16 has a second connection region 36. The first connection region 34 is connected to the second connection region 36 by means of a first pivot connection 28 and a second pivot connection 30. In detail, the first pivot connection 28 connects the first connection region 34 to a first region 32A of the intermediate member 32. The first pivot connection 28 defines the first rotation axis B. The first connection region 38 and the first region 32A of the intermediate member 32 can be pivoted relative to each other about the rotation axis B. The second pivot connection 30 connects the first region 32A to the second connection region 36. The second pivot connection 30 defines the second rotation axis C. The first rotation axis B is parallel with the second rotation axis C. The first region 32A (the intermediate member 32) may be pivoted with respect to the second connection component 36 about the second rotation axis C. The first pivot connection 28 and the second pivot connection 30 may, for example, be constructed as rotatably supported pivot pins or rotary rods.

The intermediate member 32 additionally has a second region 32B. The first region 32A and the second region 32B are secured to each other. In other embodiments, the first region 32A and the second region 32B can be, for example, in the form of integral regions of an intermediate member 32 produced from one component.

In the second region 32B, a chamber (a hollow space) is provided. In the hollow space, a first guiding element 38 and a second guiding element 42 are displaceably arranged. The first guiding element 38 protrudes partially from a housing portion of the second region 32B of the intermediate member 32. A displacement of the first guiding element 38 in the chamber of the second region 32B changes the length of the protruding portion of the first guiding element 38. The second guiding element 42 protrudes with respect to the first guiding element 38 at an opposing side partially out of the housing portion of the second region 32B of the intermediate member 32. The length of the protruding portion of the second guiding element 42 also varies with a displacement of the second guiding element 42 in the chamber of the second region 32B.

The first connection region 34 has a first guiding contour 40 and the second connection region 36 has a second guiding contour 44. The first housing element 14 is supported on the intermediate member 32 via the first guiding contour 40 and the first guiding element 38. The intermediate member 32 is supported on the second housing element 16 via the second guiding element 42 and the second guiding contour 44. Consequently, the first housing element 14 is supported on the second housing element 16 via the intermediate member 32.

Whilst the first housing element 14 is pivoted relative to the second housing element 16 in a first direction, in particular the first guiding element 38 is guided along the first guiding contour 40. Whilst the first housing element 14 is pivoted relative to the second housing element 16 in a second direction opposite the first direction, in particular the second guiding element 42 is guided along the second guiding contour 44.

Figure 4:
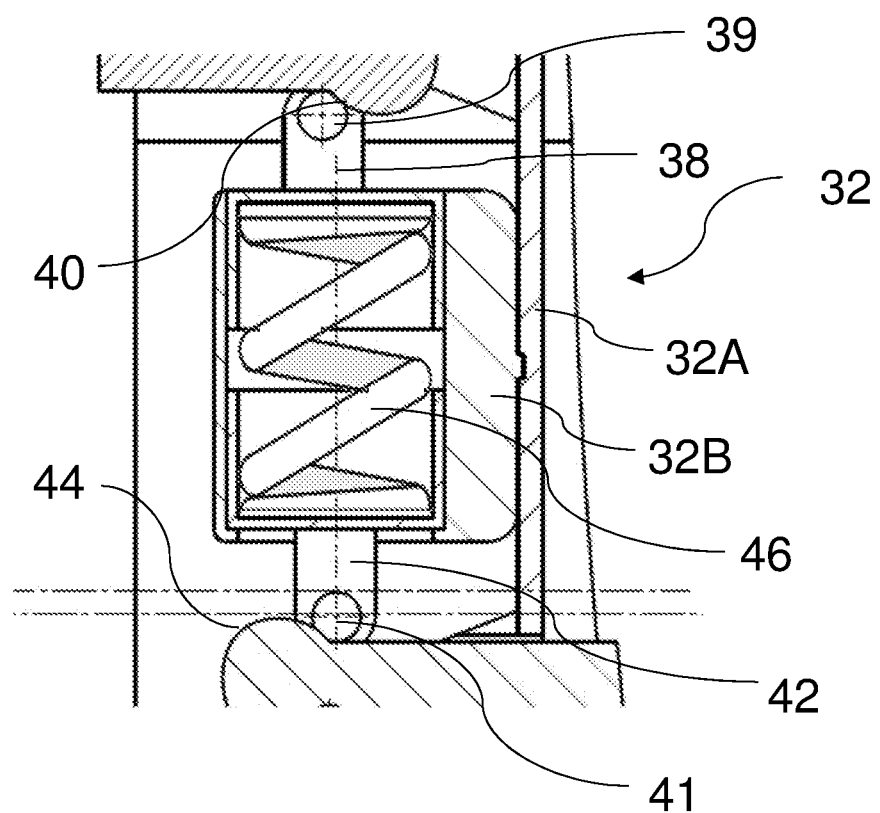
FIG. 4 is a detailed view of an intermediate member of the folding-in device.

FIG. 4 shows the intermediate member 32 in greater detail. The first guiding element 38 is arranged as a guiding sleeve with a sleeve portion in the chamber of the second region 32B of the intermediate member 32. The second guiding element 42 is arranged as a guiding sleeve with a sleeve portion in the chamber of the second region 32B of the intermediate member 32.

A resilient element 46 in the form of a pressure spring supports the first guiding element 38 and the second guiding element 42 with respect to each other. The resilient element 46 is arranged in the chamber of the second region 32B of the intermediate member 32. The resilient element 46 extends partially into the sleeve portions of the first guiding element 38 and the second guiding element 42.

The resilient element 46 acts on the first guiding element 38 for abutment against the first guiding contour 40. In the same manner, the resilient element 46 acts on the second guiding element 42 for abutment against the second guiding contour 44. The first guiding element 38 can roll via a roller 39 on the first guiding contour 40. The second guiding element 42 may also roll via a roller 41 on the second guiding contour 44. In other embodiments, the guiding elements may be provided with sliding elements or the like so that they can slide along on the guiding contours.

Figure 5A:
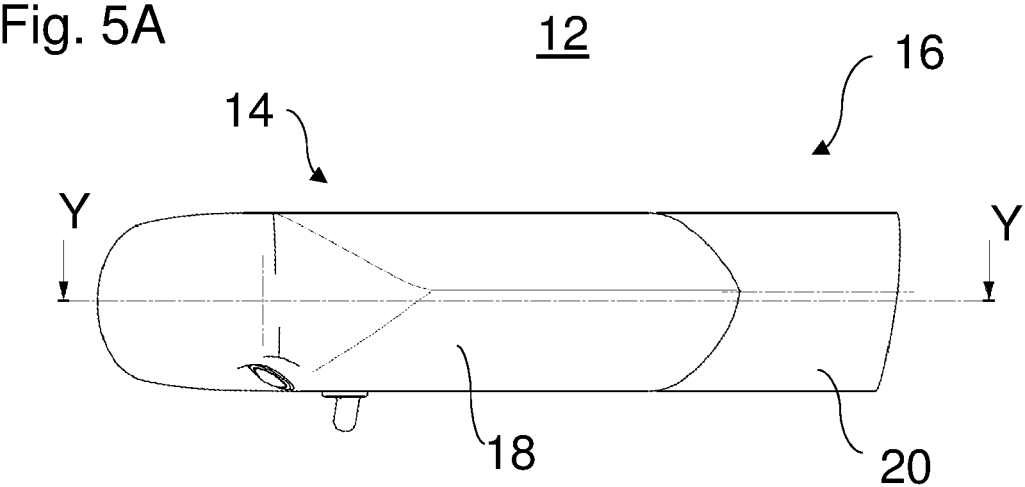
FIG. 5A is a front view of the folding-in device in an intermediate position on the path between the operating position and the first folded-in position.
Figure 5B:
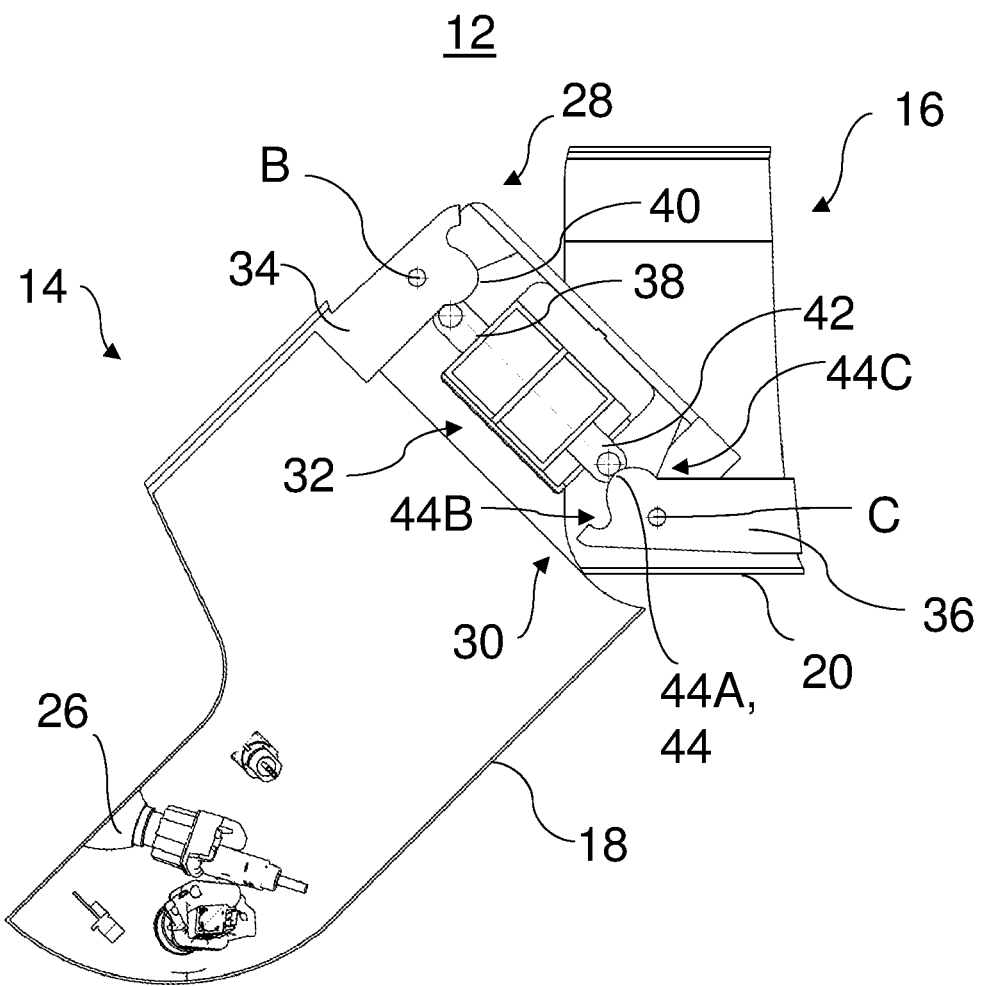
FIG. 5B is a sectioned view without hatching through the folding-in device along the line Y-Y in FIG. 5A.

FIGS. 5A and 5B show the folding-in device 12 in an intermediate position on the way to the front folded-in position (cf. FIG. 2A). In detail, the first housing element 14 pivots together with the intermediate member 32 about the second rotation axis C. At the same time, the second guiding element 42 rolls on the second guiding contour 44. The second guiding element 42 is in this instance first moved by means of the second guiding contour 44 counter to the resilient force of the pressure spring 46 (cf. FIG. 4) in the direction towards the first guiding element 38 in the intermediate member 32. After overcoming a maximum 44A of the second guiding contour 44, the second guiding element 42 moves again in the opposite direction (is deployed). Finally, the roller of the second guiding element 42 reaches a receiving member 44B. Here, the second housing element 14 is in the front folded-in position. The described cooperation between the second guiding contour 44 and the displacement of the second guiding element 42 acts as a top dead centre bearing. In this instance, only two stable positions are provided for the positioning of the second guiding element 42 relative to the second guiding contour 44. The first stable position is assumed when the roller of the second guiding element 42 is located in a receiving member 44C of the second guiding contour 44. In this instance, the first housing element 14 is in the operating position for the camera 26 (cf. FIG. 3B). The second stable position is assumed when the roller of the second guiding element 42 is located in the receiving member 44B. In this instance, the first housing element 14 is in the front folded-in position. At all intermediate positions between these two stable positions, the second guiding sleeve 42 as a result of the shape of the second guiding contour 44 and the action by the resilient component 46 (cf. FIG. 4) is caused to independently assume one of the two stable positions.

Figure 6A:
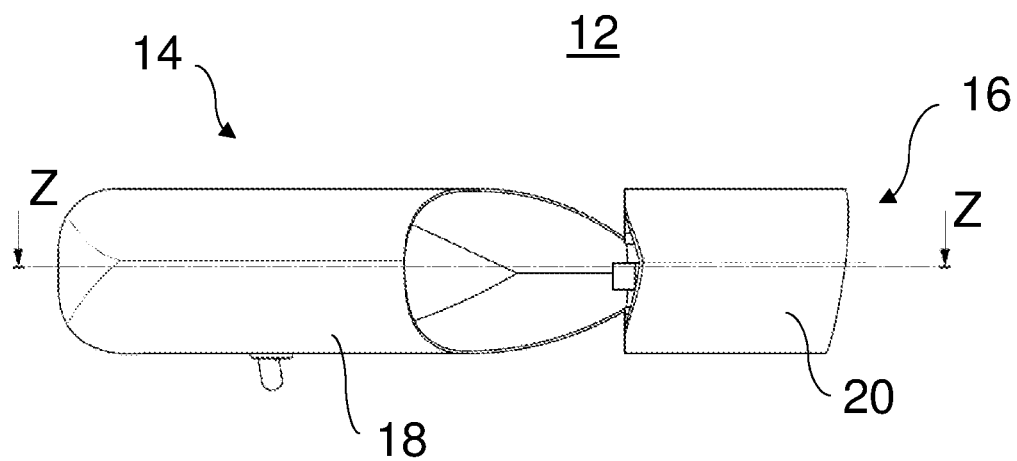
FIG. 6A is a front view of the folding-in device in an intermediate position on the path between the operating position and the second folded-in position.
Figure 6B:
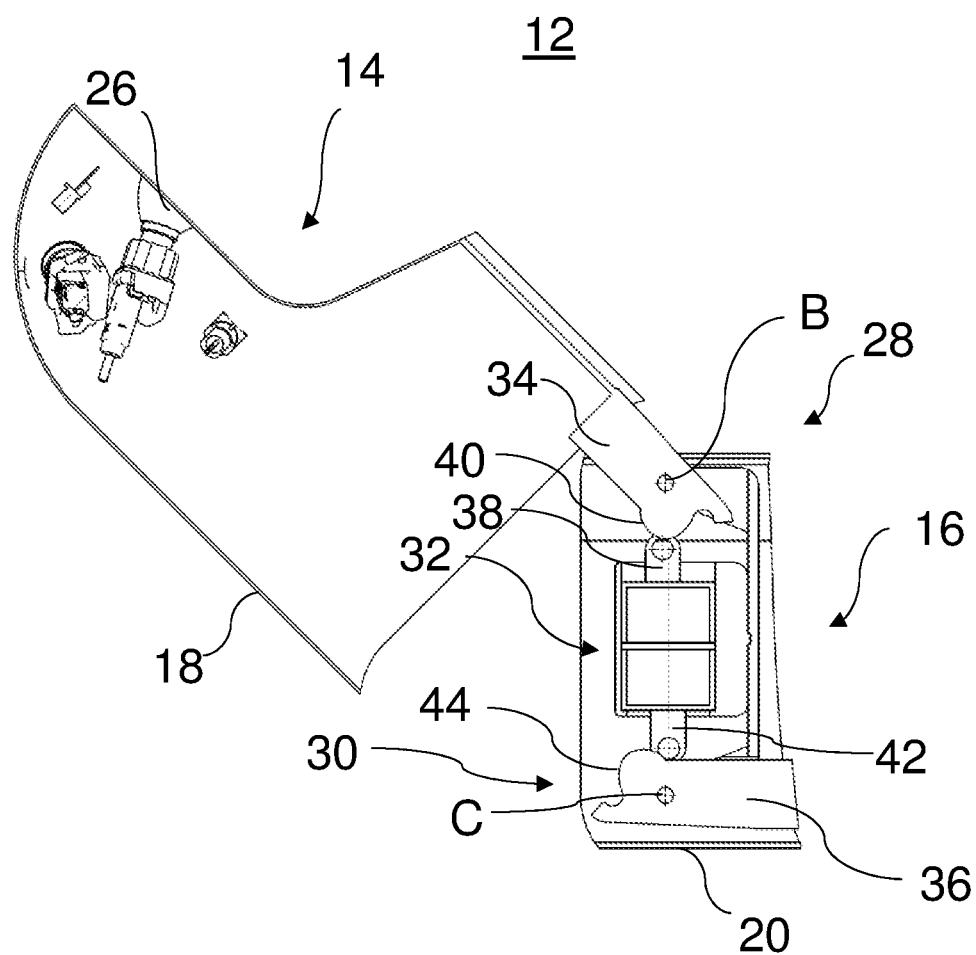
FIG. 6B is a sectioned view without hatching through the folding-in device along the line Z-Z in FIG. 6A.

FIGS. 6A and 6B show the folding-in device 12 in an intermediate position on the way to the rear folded-in position (cf. FIG. 2B). In detail, the first housing element 14 pivots about the rotation axis B without the intermediate member 32 also moving. The configuration of the first guiding contour 40 and the first guiding element 38 is similar to that of the second guiding contour 44 and the second guiding element 42. In particular, the first guiding contour 40 and the first guiding element 38 also cooperate as a top dead centre bearing so that the first housing element 14 can assume only two stable positions. In this instance, this is the operating position for the camera 26 and the rear folded-in position (cf. FIG. 2B).

Technical persons will understand that the guiding elements 38 and 42 can be constructed in such a manner that they release only the path required for the top dead centre bearing. The guiding contours 40 and 44 can additionally be constructed in such a manner that in the folded-in positions (cf. FIGS. 2A and 2B) they release less relaxation path for the pressure spring 46 (cf. FIG. 4) than in the operating position for the camera 26. That is to say, in the folded-in positions the pressure spring 46 is more powerfully compressed than in the operating position. Consequently, it is possible to prevent, when folding back from the folded-in positions, the folding-in operation from being initiated in the other direction since in this instance the guiding elements 38 and 42 are prematurely supported on each other.

In other embodiments, the arrangement and configuration of the intermediate member 32 may also be provided in such a manner that the intermediate member 32 also moves during folding into the rear folded-in position whilst the intermediate member 32 does not also move during folding into the front folded-in position.

Figure 7:
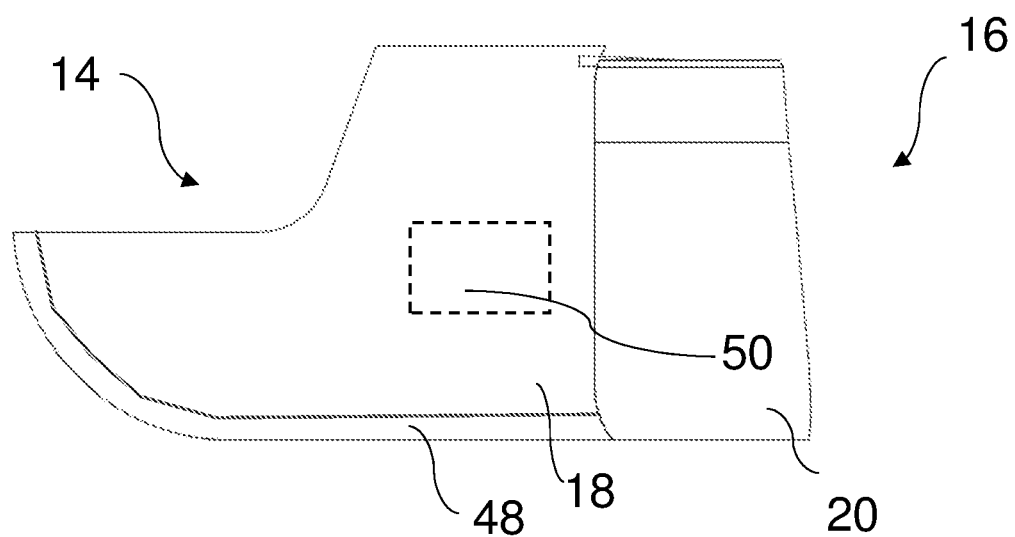
FIG. 7 is a schematic illustration of another embodiment of the folding-in device.

FIG. 7 shows another embodiment of the folding-in device. In this instance, the folding-in device is designated 12'. The folding-in device 12' may be configured in a similar manner to the folding-in device 12 described above. In addition, the folding-in device 12' may have a bumper element 48 and/or a drive unit 50.

The bumper element 48 may in particular be releasably fitted to the first housing element 14. In the event of a collision with obstacles, the bumper element 48 may prevent important components of the first housing element 14, such as, for example, one or more cameras, from becoming damaged. When an obstacle is struck, the bumper element 48 causes with plastic or resilient deformation the first housing element 14 to fold in. The bumper element 48 may when viewed in the travel direction of the vehicle 10, for example, be positioned at a front side of the first housing element 14 and/or at a rear side of the first housing element 14. In the event of damage, the bumper element 48 may be replaced in a simple manner as a result of its releasable fitting to the first housing element 14.

The drive unit 50 may be configured to automatically pivot the first housing element 14 with respect to the second housing element 16. The drive unit 50 may be at least partially received in the first housing element 14 and/or the second housing element 16. The drive unit 50 may, for example, be an electric motor. The drive unit 50 enables the persons in the vehicle to automatically pivot the first housing element 14 in order to avoid obstacles.

The present disclosure is not limited to the embodiments described above. Instead, there are possible a large number of variants and modifications which also make use of the notion of the present disclosure and are therefore included within the protective scope. In particular, the present disclosure also claims protection for the subject-matter and the features of the dependent claims independently of the claims which are referred to.

LIST OF REFERENCE NUMERALS

A Pivot direction
B First rotation axis
C Second rotation axis
10 Vehicle
12 Folding-in device
14 First housing element (camera arm)
16 Second housing element (camera base)
18 Outer shell
20 Outer shell
22 Outer edge
24 Outer edge
26 Camera
28 First pivot connection
30 Second pivot connection
32 Intermediate member
32A First region
32B Second region
34 First connection region
36 Second connection region
38 First guiding element
39 First roller
40 First guiding contour
41 Second roller
42 Second guiding element
44 Second guiding contour
44A Receiving member
44B Maximum
44C Receiving member
46 Resilient component
48 Bumper element
50 Drive unit

We claim:

1. A device for folding in a camera on a motor vehicle in order to protect the device in the event of a collision with an obstacle, comprising:
   a first housing element, in which the camera is received; and
   a second housing element which is constructed to be connected to the motor vehicle in a positionally fixed manner;
   wherein the first housing element and the second housing element are pivotably connected to each other by means of a first pivot connection, which defines a first rotation axis, and a second pivot connection, which defines a second rotation axis which is spaced apart from the first rotation axis, wherein the first rotation axis is parallel with the second rotation axis;
   further having an intermediate member, wherein the first housing element and the intermediate member are pivotably connected to each other by means of the first pivot connection or the second housing element and the intermediate member are pivotably connected to each other by means of the second pivot connection; and
   the first housing element has a first connection region which is connected via the first pivot connection to the intermediate member and the intermediate member has a first guiding element which is supported on a first guiding contour of the first connection region; or
   the second housing element has a second connection region which is connected via the second pivot connection to the intermediate member and the intermediate member has a second guiding element which is supported on a second guiding contour of the second connection region.

2. The device according to claim 1, wherein the first housing element can be pivoted relative to the second housing element out of an operating position for the camera in a first direction to a first folded-in position or in a second direction to a second folded-in position, wherein the second direction is in particular counter to the first direction.

3. The device according to claim 2, wherein:
   the first housing element and the second housing element are connected to each other in such a manner that the first housing element is acted on from an intermediate position between the operating position and the first folded-in position in order to assume the operating position or the first folded-in position; or the first housing element and the second housing element are connected to each other in such a manner that the first housing element is acted on from an intermediate position between the operating position and the second folded-in position in order to assume the operating position or the second folded-in position.

4. The device according to claim 1, wherein the first housing element and the second housing element are connected to each other by means of at least one top dead centre bearing.

5. The device according to claim 1, wherein:
the first guiding element, is a first guiding sleeve; or
the second guiding element is a second guiding sleeve.

6. The device according to claim 5, wherein the first guiding element or the second guiding element is supported so as to be able to be displaced, in particular displaced in a translational manner.

7. The device according to claim 5, wherein the intermediate member has a resilient component, in particular a pressure spring, which:
acts on the first guiding element for support on the first guiding contour; or
acts on the second guiding element for support on the second guiding contour; or supports the first guiding element and the second guiding element on each other.

8. The device according to claim 5, wherein:
the first guiding contour and the first guiding element are constructed in such a manner that the first housing element and the intermediate member can be pivoted relative to each other between two pivot positions via a top dead centre bearing; or
the second guiding contour and the second guiding element are constructed in such a manner that the second housing element and the intermediate member can be pivoted relative to each other between two pivot positions via a top dead centre bearing.

9. The device according to claim 5, wherein the first guiding element is supported in a sliding manner or via a roller on the first guiding contour; or
the second guiding element is supported in a sliding manner or via a roller on the second guiding contour.

10. The device according to claim 1, wherein an outer shell of the first housing element and an outer shell of the second housing element are in abutment with each other in a flush manner in an operating position for the camera.

11. The device according to claim 1, further having a drive unit, in particular an electric motor, for automatically pivoting the first housing element relative to the second housing element.

12. The device according to claim 1, wherein the device further has at least one bumper element which is releasably fitted to the first or second housing element in order to protect the device in the event of a collision, in particular to protect the camera and the first housing element, wherein the bumper element can in particular be plastically or resiliently deformed.

13. A motor vehicle, in particular utility vehicle, comprising:
device for folding in a camera on a motor vehicle in order to protect the device in the event of a collision with an obstacle, the device including,
a first housing element, in which the camera is received; and
a second housing element which is constructed to be connected to the motor vehicle in a positionally fixed manner;
wherein the first housing element and the second housing element are pivotably connected to each other by means of a first pivot connection, which defines a first rotation axis, and a second pivot connection, which defines a second rotation axis which is spaced apart from the first rotation axis, wherein the first rotation axis is parallel with the second rotation axis;
further having an intermediate member, wherein the first housing element and the intermediate member are pivotably connected to each other by means of the first pivot connection or the second housing element and the intermediate member are pivotably connected to each other by means of the second pivot connection; and
the first housing element has a first connection region which is connected via the first pivot connection to the intermediate member and the intermediate member has a first guiding element which is supported on a first guiding contour of the first connection region; or
the second housing element has a second connection region which is connected via the second pivot connection to the intermediate member and the intermediate member has a second guiding element which is supported on a second guiding contour of the second connection region.

* * * * *